(12) United States Patent
Togashi et al.

(10) Patent No.: US 8,493,710 B2
(45) Date of Patent: Jul. 23, 2013

(54) MULTILAYER CAPACITOR WITH IMPROVED ADHESIVENESS BETWEEN THE LAYERS

(75) Inventors: Masaaki Togashi, Tokyo (JP); Kazuyuki Hasebe, Tokyo (JP)

(73) Assignee: TDK Corporation, Tokyo (JP)

( * ) Notice: Subject to any disclaimer, the term of this patent is extended or adjusted under 35 U.S.C. 154(b) by 261 days.

(21) Appl. No.: 12/904,694

(22) Filed: Oct. 14, 2010

(65) Prior Publication Data
US 2011/0096464 A1 Apr. 28, 2011

(30) Foreign Application Priority Data
Oct. 23, 2009 (JP) ................................. 2009-244793

(51) Int. Cl.
*H01G 4/06* (2006.01)
*H01G 4/005* (2006.01)

(52) U.S. Cl.
USPC ....................................... 361/321.2; 361/303

(58) Field of Classification Search
USPC ............. 361/321.2, 303, 306.3, 321.3, 321.4, 361/304, 305
See application file for complete search history.

(56) References Cited

U.S. PATENT DOCUMENTS

| | | | |
|---|---|---|---|
| 6,574,089 B1 | 6/2003 | Moriwaki et al. | |
| 6,661,640 B2 | 12/2003 | Togashi | |
| 6,661,641 B2 | 12/2003 | Moriwaki et al. | |
| 7,292,429 B2 * | 11/2007 | Randall et al. | 361/303 |
| 7,667,950 B2 * | 2/2010 | Togashi | 361/306.3 |
| 8,004,820 B2 * | 8/2011 | Itamura | 361/306.3 |
| 8,045,319 B2 | 10/2011 | Ritter et al. | |
| 8,130,484 B2 * | 3/2012 | Koga et al. | 361/303 |
| 2008/0174934 A1 * | 7/2008 | Togashi | 361/303 |
| 2009/0109596 A1 * | 4/2009 | Togashi | 361/303 |

FOREIGN PATENT DOCUMENTS

| | | | |
|---|---|---|---|
| JP | 05135990 A | * | 6/1993 |
| JP | 06069063 A | * | 3/1994 |
| JP | 09050935 A | * | 2/1997 |
| JP | A-9-50935 | | 2/1997 |
| JP | 09270360 A | * | 10/1997 |
| JP | A-2003-51423 | | 2/2003 |
| JP | A-2004-140183 | | 5/2004 |
| JP | 2006128283 A | * | 5/2006 |
| JP | 2006190774 A | * | 7/2006 |
| JP | A-2008-294298 | | 12/2008 |
| JP | A-2009-60080 | | 3/2009 |

* cited by examiner

*Primary Examiner* — David M Sinclair
(74) *Attorney, Agent, or Firm* — Oliff & Berridge, PLC (57) ABSTRACT

A multilayer capacitor is provided with improved adhesiveness of layers of an element body and improved reliability. Outer edge of a second principal-surface electrode portion are respectively separated from an end surface and lateral surfaces, and are respectively arranged so as to surround the forefront portion of a third principal-surface electrode portion at one end side when viewed from a lamination direction. Outer edges of a fourth principal-surface electrode portion are respectively separated from an end surface and lateral surfaces, and are arranged so as to surround the forefront portion of a first principal-surface electrode portion in the width direction at the other end side when viewed from the lamination direction.

5 Claims, 8 Drawing Sheets

Conventional Art

MULTILAYER CAPACITOR WITH IMPROVED ADHESIVENESS BETWEEN THE LAYERS

BACKGROUND OF THE INVENTION

1. Field of the Invention

The present invention relates to a multilayer capacitor.

2. Related Background Art

A multilayer capacitor is known which includes an element body formed by laminating a plurality of dielectric layers, a pair of terminal electrodes formed at both end portions of the element body, a first internal electrode formed inside the element body to extend from one end surface of the element body and connected one terminal electrode, and a second internal electrode formed inside the element body to extend from the other end surface of the element body and connected to the other terminal electrode (for example, see Japanese Patent Application Laid-Open No. 2003-051423). In this multilayer capacitor, the internal electrode is led to one end surface of the element body in the longitudinal direction and both end surfaces of the element body in the transverse direction, and is connected to the terminal electrode.

SUMMARY OF THE INVENTION

In forming the element body by laminating the dielectric layer and performing calcination, fixing strength between the dielectric layer and the internal electrode is insufficient, thus in the above-described multilayer capacitor, there is demand for further improvement in adhesiveness between the layers of the element body in laminating a plurality of dielectric layers with an internal electrode formed thereon and performing calcination. In general, the multilayer capacitor has ESL (Equivalent Series Inductance) which is a minute inductance component, thus there is also demand for reduction in the ESL. A region where the internal electrodes do not overlap each other in the lamination direction occurs due to lamination misalignment between the internal electrodes at the time of lamination, leading to variations in electrostatic capacitance.

The invention has been finalized in order to solve the above problems, and an object of the invention is to provide a multilayer capacitor capable of improving adhesiveness of the layers of an element body and improving reliability.

A multilayer capacitor according to an embodiment of the invention includes an element body formed by laminating a plurality of dielectric layers, the element body having a pair of end surfaces and four lateral surfaces connecting the end surfaces to each other, a first terminal electrode covering one end side of the element body, a second terminal electrode covering the other end side of the element body, a first internal electrode formed inside the element body to extend between the one end side of the element body and the other end side of the element body, and electrically connected to the first terminal electrode, and a second internal electrode formed inside the element body to extend between the one end side of the element body and the other end side of the element body with a dielectric layer sandwiched between the second internal electrode and the first internal electrode, and electrically connected to the second terminal electrode. The first terminal electrode has a first end portion covering an end surface at the one end side of the element body and first lateral portions covering the one end side of the element body at the four lateral surfaces. The second terminal electrode has a second end portion covering an end surface at the other end side of the element body and second lateral portions covering the other end side of the element body at the four lateral surfaces. The first internal electrode has a first principal-surface electrode portion and a second principal-surface electrode portion in order from the other end side of the element body to the one end side of the element body, and a first lead portion respectively connecting the second principal-surface electrode portion and the first lateral portion of the first terminal electrode. The second internal electrode has a third principal-surface electrode portion and a fourth principal-surface electrode portion in order from the one end side of the element body to the other end side of the element body, and a second lead portion respectively connecting the fourth principal-surface electrode portion and the second lateral portion of the second terminal electrode. The outer edges of the second principal-surface electrode portion are respectively separated from the end surface and the lateral surfaces at the one end side of the element body and are respectively arranged outside the outer edges of the first principal-surface electrode portion in the width direction of the first internal electrode and the second internal electrode so as to surround the forefront portion of the third principal-surface electrode portion at one end side of the element body when viewed from a lamination direction of the element body. The outer edges of the fourth principal-surface electrode portion are separated from the end surface and the lateral surfaces at the other end side of the element body and are respectively arranged outside the outer edges of the third principal-surface electrode portion in the width direction so as to surround the forefront portion of the first principal-surface electrode portion at the other end side of the element body when viewed from the lamination direction. The first lead portion is connected to the outer edge of the second principal-surface electrode portion in the width direction near the other end side of the element body, and the second lead portion is connected to the outer edge of the fourth principal-surface electrode portion in the width direction near the one end side of the element body.

In this multilayer capacitor, the outer edges of the second principal-surface electrode portion are respectively separated from the end surface and the lateral surfaces at the one end side, such that an exposed portion where the surface of the dielectric layer is exposed is formed at one end side of the dielectric layer with the first internal electrode formed thereon. That is, in the dielectric layer with the first internal electrode formed thereon, not only an exposed portion near the second terminal electrode having a different polarity but also an exposed portion near the first terminal electrode having the same polarity is formed. The outer edges of the fourth principal-surface electrode portion are separated from the end surface and the lateral surfaces at the other end side, such that an exposed portion where the surface of the dielectric layer is exposed is formed at the other end side of the dielectric layer with the second internal electrode formed thereon. That is, in the dielectric layer with the second internal electrode formed thereon, not only an exposed portion near the first terminal electrode having a different polarity but also an exposed portion near the second terminal electrode having the same polarity is formed. At the time of calcination, the fixing strength between the dielectric layer and the dielectric layer is greater than the fixing strength between the dielectric layer and the internal electrode. Thus, the dielectric layer with the first internal electrode formed thereon and the dielectric layer with the second internal electrode formed thereon are rigidly fixed to the overlying dielectric layers at both of the one end side and the other end side at the time of calcination. The dielectric layers are rigidly fixed to each other at both ends of the element body, and adhesiveness is improved. In particular, the terminal electrode having the same polarity as the lead portion is narrowed by the exposed portion of the dielectric layer compared to the terminal electrode having a different polarity. Hence, there is demand for an increase in the area of the exposed portion. Meanwhile, the first lead portion is connected to the outer edge of the second principal-surface electrode portion in the width direction near the other end side. Thus, in the dielectric layer with the first internal electrode formed thereon, the exposed portion at the one end side can be increased. The second lead portion is connected to the outer edge of the fourth principal-surface electrode portion in the width direction near the one end side. Thus, in the dielectric layer with the second internal electrode formed thereon, the exposed portion at the other end side can be increased. Therefore, the dielectric layers are more rigidly fixed to each other at both ends of the element body, and adhesiveness is improved.

The first lead portion is connected to the second principal-surface electrode portion and the first lateral portion of the first terminal electrode, and the second lead portion is connected to the fourth principal-surface electrode portion and the second lateral portion of the second terminal electrode. In this way, the first lead portion and the second lead portion having different polarities are led to the same lateral surface of the element body 1, and the terminal electrodes have the lateral portions at the lateral surface. Thus, the inter-lead-electrode distances between the first lead portion and the second lead portion having different polarities are shortened compared with a case where the internal electrode is simply led from the end surface of the element body. That is, the current paths can be shortened, and the ESL can be reduced. For example, when the internal electrode is moved to the lateral portion of the terminal electrode on the mounting surface in the width direction so as to reduce the ESL, the ESL increases adversely compared to a case where the opposite lateral portion is mounted. However, in the multilayer capacitor according to the embodiment of the invention, each lead portion is led to the lateral surface of the element body, and even when any lateral portion is mounted on the substrate, the ESL can be reduced. Therefore, variations in the ESL depending on the mounting direction can be reduced. In particular, the first lead portion is connected to the outer edge of the second principal-surface electrode portion in the width direction near the other end side, and the second lead portion is connected to the outer edge of the fourth principal-surface electrode portion in the width direction near the one end side, further shortening the current paths and further reducing the ESL.

In the width direction of the first internal electrode and the second internal electrode, the outer edges of the second principal-surface electrode portion are arranged outside the outer edges of the first principal-surface electrode portion, and arranged so as to surround the forefront portion of the third principal-surface electrode portion at the one end side when viewed from the lamination direction. In the width direction, the outer edges of the fourth principal-surface electrode portion are arranged outside the outer edges of the third principal-surface electrode portion, and arranged so as to surround the forefront portion of the first principal-surface electrode portion at the other end side when viewed from the lamination direction. For example, when viewed from the lamination direction, the second principal-surface electrode portion of the first internal electrode and the third principal-surface electrode portion of the second internal electrode may have the same size. In this case, when lamination misalignment occurs at the time of lamination of the dielectric layers, a region occurs between the second principal-surface electrode portion and the third principal-surface electrode portion where the second principal-surface electrode portion and the third principal-surface electrode portion do not overlap each other, and a capacitive component is not formed. Accordingly, variations in electrostatic capacitance of the multilayer capacitor may occur. However, in the multilayer capacitor according to the embodiment of the invention, even when lamination misalignment occurs, the second principal-surface electrode portion can be maintained in a state of overlapping the third principal-surface electrode portion, and the fourth principal-surface electrode portion can be maintained in a state of overlapping the first principal-surface electrode portion. Therefore, variations in electrostatic capacitance due to lamination misalignment can be suppressed. As a result, reliability of the multilayer capacitor can be improved.

The first lead portion may be connected to the end portion at the outer edges of the second principal-surface electrode portion in the width direction near the other end side of the element body, and the second lead portion may be connected to the end portion at the outer edge of the fourth principal-surface electrode portion in the width direction near the one end side of the element body. With this configuration, the area of the exposed portion where the surface of the dielectric layer is exposed can be increased near the one end side from the first lead portions. The area of the exposed portion where the surface of the dielectric layer is exposed can be increased near the other end side of the element body from the second lead portion. Therefore, the dielectric layers are more rigidly fixed to each other, and adhesiveness of the element body is improved. The distances between the first lead portion and the second lead portion can be shortened, further reducing the current paths and further reducing the ESL.

The space between the outer edge of the second principal-surface electrode portion and the outer edge of the third principal-surface electrode portion in the longitudinal direction of the first internal electrode and the second internal electrode may be smaller than the spaces between the outer edges of the second principal-surface electrode portion and the outer edges of the third principal-surface electrode portion in the width direction. The space between the outer edge of the fourth principal-surface electrode portion and the outer edge of the first principal-surface electrode portion in the longitudinal direction may be smaller than the spaces between the outer edges of the fourth principal-surface electrode portion and the outer edges of the first principal-surface electrode portion in the width direction. With this configuration, the distance between the end surface of the element body and the outer edge of the second principal-surface electrode portion at the one end side can be increased, increasing the area of the exposed portion at the one end side of the element body where the surface of the dielectric layer is exposed. The distance between the end surface of the element body and the outer edge of the fourth principal-surface electrode portion at the other end side can be increased, increasing the area of the exposed portion at the other end side of the element body where the surface of the dielectric layer is exposed. As a result, adhesiveness of the element body can be improved.

The first lead portion may have first small-width portion extending from the second principal-surface electrode portion in the width direction, and first connection portion extending to the one end side of the element body at portion where connection is made to the first lateral portion of the first terminal electrode. The second lead portion may have second small-width portion extending from the fourth principal-surface electrode portion in the width direction, and second connection portion extending to the other end side of the element body at portion where connection is made to the second lateral portions of the second terminal electrode. With this configuration, the current paths can be shortened because of the small-width portions arranged inside the element body, and the ESL can be made low. In addition, since the connection portions are formed, connectivity to the terminal electrodes can be ensured. The surfaces of the dielectric layers are exposed from slits formed between the small-width portions and the connection portions, increasing the exposed areas of the dielectric layers. Therefore, adhesiveness of the element body can be improved.

The second principal-surface electrode portion may have inclined portions at four corners, and the fourth principal-surface electrode portion may have inclined portions at four corners. The inclined portions are formed at the four corners of the second principal-surface electrode portion, and the inclined portions are formed at the four corners of the fourth principal-surface electrode portion, such that the areas of the exposed portions where the surface of the dielectric layer is exposed can be increased. Therefore, the dielectric layers are more rigidly fixed to each other, and adhesiveness of the element body is improved.

According to the invention, adhesiveness of the layers of the element body can be improved, and reliability can be improved.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Hereinafter, preferred embodiments of the invention will be described in detail with reference to the accompanying drawings. In the description, the same elements or elements having the same functions are represented by the same reference numerals, and overlapping description will be omitted.

[First Embodiment]

Figure 1:
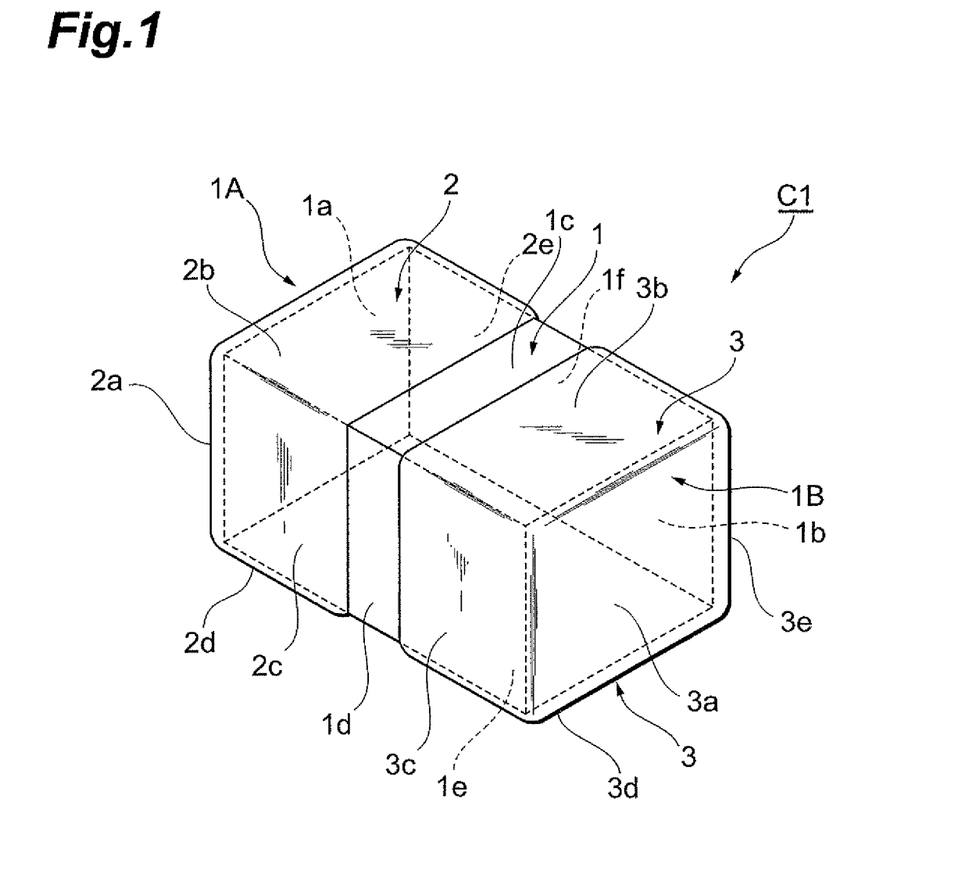
FIG. 1 is a perspective view showing a multilayer capacitor according to a first embodiment.
Figure 2:
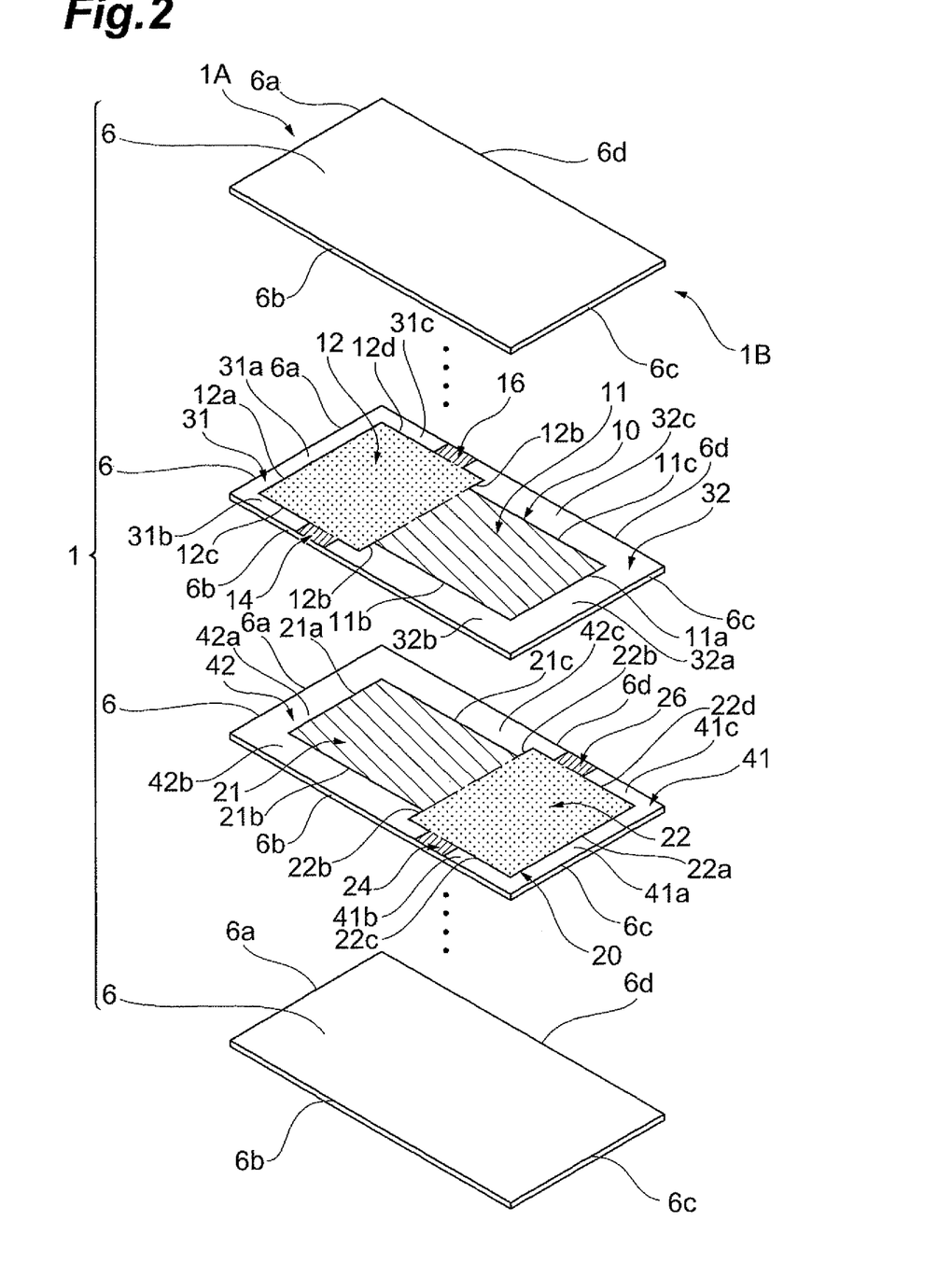
FIG. 2 is an exploded view of an element body when exploded by dielectric layer.
Figure 3:
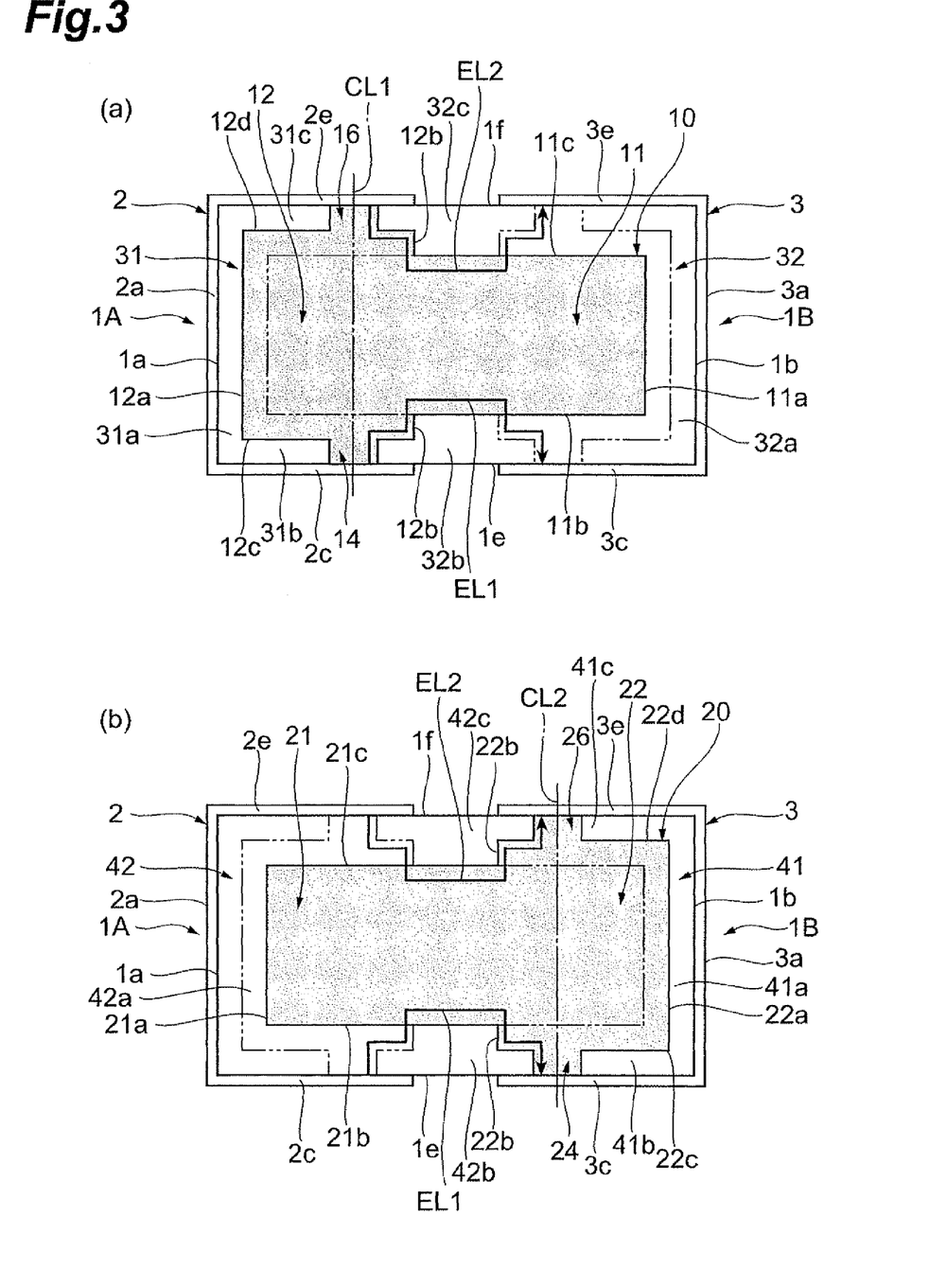
FIGS. 3A and 3B are diagrams of a first internal electrode and a second internal electrode of the multilayer capacitor according to the first embodiment when viewed from a lamination direction.

The configuration of a multilayer capacitor C1 according to a first embodiment will be described with reference to FIGS. 1 to 3B. FIG. 1 is a perspective view showing the multilayer capacitor C1 according to the first embodiment. FIG. 2 is an exploded view of an element body when exploded by dielectric layer. FIGS. 3A and 3B are diagrams of a first internal electrode and a second internal electrode when viewed from a lamination direction. In FIG. 3A, a solid line indicates the first internal electrode, and a virtual line indicates the second internal electrode. In FIG. 3B, a solid line indicates the second internal electrode, and a virtual line indicates the first internal electrode. As shown in FIG. 1, the multilayer capacitor C1 includes an element body 1 which is constituted to have a substantially rectangular parallelepiped having a plurality of rectangular plate-shaped dielectric layers laminated as a single body, and a first terminal electrode 2 and a second terminal electrode 3. The multilayer capacitor C1 has about length:width:thickness=2:1:0.6 as a dimension ratio of length, width, and thickness, for example, about 1.0 mm×0.5 mm×0.3 mm or about 0.6 mm×0.3 mm×0.2 mm.

The element body 1 has an end surface 1a at one end 1A side of the element body 1 and an end surface 1b at the other end 1B side. The element body 1 also has four lateral surfaces 1c, 1d, 1e, and 1f which connect the end surface 1a and the end surface 1b.

The first terminal electrode 2 is an external electrode which covers the one end 1A side of the element body 1. The first terminal electrode 2 has a first end portion 2a which covers an end surface 1a of the element body 1, a first lateral portion 2b which covers a lateral surface 1c at the one end 1A side, a first lateral portion 2c which covers a lateral surface 1d at the one end 1A side, a first lateral portion 2d which covers a lateral surface 1e at the one end 1A side, and a first lateral portion 2e which covers a lateral surface 1f at the one end 1A side. The second terminal electrode 3 is an external electrode which covers the other end 1B side of the element body 1. The second terminal electrode 3 has a second end portion 3a which covers an end surface 1b of the element body 1, a second lateral portion 3b which covers a lateral surface 1c at the other end 1B side, a second lateral portion 3c which covers a lateral surface 1d at the other end 1B side, a second lateral portion 3d which covers a lateral surface 1e at the other end 1B side, and a second lateral portion 3e which covers a lateral surface 1f at the other end 1B side. The first terminal electrode 2 and the second terminal electrode 3 are formed by attaching conductive paste mainly containing Cu, Ni, Ag, Pd, or the like to the outer surface of the element body 1 through dipping or the like, performing baking at a predetermined temperature (for example, about 700° C.), and performing electrical plating. For electrical plating, Ni, Sn, or the like may be used. The thickness of each of the first terminal electrode 2 and the second terminal electrode 3 is set in a range of 10 to 30 μm. The length of each of the lateral portions 2b to 2e of the first terminal electrode 2 to the other end 1B side and the length of each of the lateral portions 3b to 3e of the second terminal electrode 3 to the one end 1A side are set to be about 30% to 40% with respect to the length of the element body 1.

As shown in FIG. 2, the element body 1 is a laminate in which a plurality of rectangular plate-shaped dielectric layers 6, and a plurality of first internal electrodes 10 and second internal electrodes 20. The first internal electrodes 10 and the second internal electrodes 20 are arranged inside the element body 1 one by one along the lamination direction of the dielectric layers 6 (hereinafter, simply referred to as "lamination direction"). The first internal electrode 10 and the second internal electrode 20 are arranged to be opposite each other so as to sandwich at least one dielectric layer 6 therebetween. In the practical multilayer capacitor C1, a plurality of dielectric layers 6 are combined as a single body such that the boundary therebetween cannot be viewed. Specifically, as shown in FIG. 2, in the element body 1, a ceramic green sheet with the electrode pattern of the first internal electrode 10 formed thereon and a ceramic green sheet with the electrode pattern of the second internal electrode 20 formed thereon are laminated between ceramic green sheets with no electrode pattern formed thereon and combined as a single body through calcination. Each ceramic green sheet mainly contains $BaTiO_3$, $CaZrO_3$, or the like, and the thickness thereof, that is, the thickness of the dielectric layer 6 after calcination is in a range of 1 μm to 2 μm. Although a plurality of first internal electrodes 10 and second internal electrodes 20 are formed inside the element body 1, in FIG. 2, one dielectric layer 6 with the first internal electrode 10 formed thereon and one dielectric layer 6 with the second internal electrode 20 formed thereon are shown.

The first internal electrode 10 is formed inside the element body 1 to extend between the one end 1A side and the other end 1B side of the element body 1, and is electrically connected to the first terminal electrode 2. The second internal electrode 20 is formed inside the element body 1 to extend between the one end 1A side and the other end 1B side of the element body 1 with the dielectric layer 6 sandwiched between the first internal electrode 10 and the second internal electrode 20, and is electrically connected to the second terminal electrode 3. The first internal electrode 10 and the second internal electrode 20 contain a conductive material, such as Ni, Ni alloy, or the like, and are constituted as a sintered body of conductive paste containing the relevant conductive material. The thickness of each of the first internal electrode 10 and the second internal electrode 20 after sintering is in a range of 0.8 μm to 1.5 μm. In the following description, the direction in which the first internal electrode 10 and the second internal electrode 20 extend is referred to as "longitudinal direction", the width direction of the first internal electrode 10 and the second internal electrode 20 orthogonal to the longitudinal direction is referred to as "width direction".

The first internal electrode 10 has a first principal-surface electrode portion 11 and a second principal-surface electrode portion 12 in order from the other end 1B side of the element body 1 to the one end 1A side of the element body 1, and a pair of first lead portion 14 and 16 respectively connecting the second principal-surface electrode portion 12 and the first lateral portions 2c and 2e of the first terminal electrode 2. In FIG. 2, with regard to the first principal-surface electrode portion 11, the second principal-surface electrode portion 12, and the first lead portions 14 and 16, the regions are delimited by a one-dot-chain line, and hatched and dotted for distinction.

The first principal-surface electrode portion 11 is a rectangular region arranged at the other end 1B side in the first internal electrode 10. The second principal-surface electrode portion 12 is a rectangular region arranged at the one end 1A side in the first internal electrode 10. The size of the second principal-surface electrode portion 12 in the width direction is at least greater than the size of the first principal-surface electrode portion 11 in the width direction. Outer edges 12c and 12d of the second principal-surface electrode portion 12 in the width direction are respectively arranged outside outer edges 11b and 11c of the first principal-surface electrode portion 11 in the width direction. The size of the second principal-surface electrode portion 12 in the width direction is about 120% to 140% of the size of the first principal-surface electrode portion 11 in the width direction. An outer edge 11a of the first principal-surface electrode portion 11 at the other end 1B side and an outer edge 6c of the dielectric layer 6 are separated from each other. The outer edge 11b of the first principal-surface electrode portion 11 in the width direction and an outer edge 6b of the dielectric layer 6 are separated from each other, and the outer edge 11c of the first principal-surface electrode portion 11 in the width direction and an outer edge 6d of the dielectric layer 6 are separated from each other. The outer edge 12c of the second principal-surface electrode portion 12 in the width direction and the outer edge 6b of the dielectric layer 6 are separated from each other, and the outer edge 12d of the second principal-surface electrode portion 12 in the width direction and the outer edge 6d of the dielectric layer 6 are separated from each other. The outer edge 12a of the second principal-surface electrode portion 12 at the one end 1A side and an outer edge 6a of the dielectric layer 6 are separated from each other.

The first lead portion 14 extends from the outer edge 12c of the second principal-surface electrode portion 12 in the width direction and reaches the outer edge 6b of the dielectric layer 6. The first lead portion 16 extends from the outer edge 12d of the second principal-surface electrode portion 12 in the width direction and reaches the outer edge 6d of the dielectric layer 6. The positions of the first lead portions 14 and 16 in the longitudinal direction are regions where connection can be made to the first lateral portions 2c and 2e of the first terminal electrode 2, and the first lead portions 14 and 16 are respectively arranged at the outer edges 12c and 12d of the second principal-surface electrode portion 12 near the other end 1B side. That is, a center axis CL1 of the first lead portions 14 and 16 of the first internal electrode 10 in the longitudinal direction is arranged near the other end 1B side from the center axis of the second principal-surface electrode portion 12.

In the multilayer capacitor C1 according to the first embodiment, the outer edge 12b of the second principal-surface electrode portion 12 at the other end 1B side is arranged near the one end 1A side from the center position of the element body 1 in the longitudinal direction. The outer edge 12a of the second principal-surface electrode portion 12 at the one end 1A side is arranged so as to be separated from the end surface 1a of the element body 1. The first lead portions 14 and 16 are arranged between the center axis of the second principal-surface electrode portion 12 and the outer edge 12b at the other end 1B side. The size of the second principal-surface electrode portion 12 in the width direction is greater than the size of the first principal-surface electrode portion 11 in the width direction. The first internal electrode 10 has a shape line-symmetrical with respect to the center axis of the dielectric layer 6 in the width direction.

In this embodiment, an exposed portion 31 where the surface of the dielectric layer 6 is exposed is formed near the one end 1A side from the first lead portions 14 and 16. The exposed portion 31 has a side portion 31a between the outer edge 6a and the outer edge 12a of the second principal-surface electrode portion 12, a side portion 31b between the outer edge 6b and the outer edge 12c of the second principal-surface electrode portion 12, and a side portion 31c between the outer edge 6d and the outer edge 12d of the second principal-surface electrode portion 12. An exposed portion 32 where the surface of the dielectric layer 6 is exposed is formed near the other end 1B side from the first lead portions 14 and 16. The exposed portion 32 has a side portion 32a between the outer edge 6c and the outer edge 11a of the first principal-surface electrode portion 11, a side portion 32b between the outer edge 6b and the outer edge 11b of the first principal-surface electrode portion 11 and between the outer edge 6b and the outer edge 12c of the second principal-surface electrode portion 12, and a side portion 32c between the outer edge 6d and the outer edge 11c of the first principal-surface electrode portion 11 and between the outer edge 6d and the outer edge 12d of the second principal-surface electrode portion 12.

The second internal electrode 20 has a third principal-surface electrode portion 21 and a fourth principal-surface electrode portion 22 in order from the one end 1A side of the element body 1 to the other end 1B side of the element body 1, and a pair of second lead portions 24 and 26 respectively connecting the fourth principal-surface electrode portion 22 and the second lateral portions 3c and 3e of the second terminal electrode 3. In FIG. 2, with regard to the third principal-surface electrode portion 21, the fourth principal-surface electrode portion 22, and the second lead portions 24 and 26, the regions are delimited by a one-dot-chain line, and hatched and dotted for distinction.

The third principal-surface electrode portion 21 is a rectangular region arranged at the one end 1A side in the second internal electrode 20. The fourth principal-surface electrode portion 22 is a rectangular region arranged at the other end 1B side in the second internal electrode 20. The size of the fourth principal-surface electrode portion 22 in the width direction is at least greater than the size of the third principal-surface electrode portion 21 in the width direction. Outer edges 22c and 22d of the fourth principal-surface electrode portion 22 in the width direction are respectively arranged outside outer edges 21b and 21c of the third principal-surface electrode portion 21 in the width direction. The size of the fourth principal-surface electrode portion 22 in the width direction is about 120% to 140% of the size of the third principal-surface electrode portion 21 in the width direction. An outer edge 21a of the third principal-surface electrode portion 21 at the one end 1A side and an outer edge 6a of the dielectric layer 6 are separated from each other. The outer edge 21b of the third principal-surface electrode portion 21 in the width direction and an outer edge 6b of the dielectric layer 6 are separated from each other, and the outer edge 21c of the third principal-surface electrode portion 21 in the width direction and an outer edge 6d of the dielectric layer 6 are separated from each other. The outer edge 22c of the fourth principal-surface electrode portion 22 in the width direction and the outer edge 6b of the dielectric layer 6 are separated from each other, and the outer edge 22d of the fourth principal-surface electrode portion 22 in the width direction and the outer edge 6d of the dielectric layer 6 are separated from each other. An outer edge 22a of the fourth principal-surface electrode portion 22 at the other end 1B side and an outer edge 6c of the dielectric layer 6 are separated from each other.

The second lead portion 24 extends from the outer edge 22c of the fourth principal-surface electrode portion 22 in the width direction and reaches the outer edge 6b of the dielectric layer 6. The second lead portion 26 extends from the outer edge 22d of the fourth principal-surface electrode portion 22 in the width direction and reaches the outer edge 6d of the dielectric layer 6. The positions of the second lead portions 24 and 26 in the longitudinal direction are regions where connection can be made to the second lateral portions 3c and 3e of the second terminal electrode 3, and the second lead portions 24 and 26 are respectively arranged at the outer edges 22c and 22d of the fourth principal-surface electrode portion 22 near the one end 1A side. That is, a center axis CL2 of the second lead portions 24 and 26 of the second internal electrode 20 in the longitudinal direction is arranged near the one end 1A side from the center axis of the fourth principal-surface electrode portion 22.

In the multilayer capacitor C1 according to the first embodiment, an outer edge 22b of the fourth principal-surface electrode portion 22 at the one end 1A side is arranged near the other end 1B side from the center position of the element body 1 in the longitudinal direction. The outer edge 22a of the fourth principal-surface electrode portion 22 at the other end 1B side is arranged so as to be separated from the end surface 1b of the element body 1. The second lead portions 24 and 26 are arranged between the center axis of the fourth principal-surface electrode portion 22 and the outer edge 22b at the one end 1A side. The size of the fourth principal-surface electrode portion 22 in the width direction is greater than the size of the third principal-surface electrode portion 21 in the width direction. The second internal electrode 20 has a shape line-symmetrical with respect to the center axis of the dielectric layer 6 in the width direction.

In this embodiment, an exposed portion 41 where the surface of the dielectric layer 6 is exposed is formed near the other end 1B side from the second lead portions 24 and 26. The exposed portion 41 has a side portion 41a between the outer edge 6c and the outer edge 22a of the fourth principal-surface electrode portion 22, a side portion 41b between the outer edge 6b and the outer edge 22c of the fourth principal-surface electrode portion 22, and a side portion 41c between the outer edge 6d and the outer edge 22d of the fourth principal-surface electrode portion 22. An exposed portion 42 where the surface of the dielectric layer 6 is exposed is formed near the one end 1A side from the second lead portions 24 and 26. The exposed portion 42 has a side portion 42a between the outer edge 6a and the outer edge 21a of the third principal-surface electrode portion 21, a side portion 42b between the outer edge 6b and the outer edge 21b of the third principal-surface electrode portion 21 and between the outer edge 6b and the outer edge 22c of the fourth principal-surface electrode portion 22, and a side portion 42c between the outer edge 6d and the outer edge 21c of the third principal-surface electrode portion 21 and between the outer edge 6d and the outer edge 22d of the fourth principal-surface electrode portion 22.

Description will be provided as to how the first internal electrode 10 and the second internal electrode 20 formed as described above overlap each other when viewed from the lamination direction. The first principal-surface electrode portion 11 of the first internal electrode 10 and the third principal-surface electrode portion 21 of the second internal electrode 20 have the same size in the width direction. The second principal-surface electrode portion 12 of the first internal electrode 10 and the fourth principal-surface electrode portion 22 of the second internal electrode 20 have the same size in the width direction. When viewed from the lamination direction, a portion of the first principal-surface electrode portion 11 and a portion of the third principal-surface electrode portion 21 overlap each other around the center position of the element body 1. At the relevant position, the outer edges 11b and 11c of the first principal-surface electrode portion 11 in the width direction are respectively aligned with the outer edges 21b and 21c of the third principal-surface electrode portion 21 in the width direction when viewed from the lamination direction. When viewed from the lamination direction, at the one end 1A side of the element body 1, a portion of the second principal-surface electrode portion 12 and the forefront portion of the third principal-surface electrode portion 21 at the one end 1A side overlap each other. At the relevant position, the outer edges 12a, 12c, and 12d of the second principal-surface electrode portion 12 are arranged so as to surround the forefront portion of the third principal-surface electrode portion 21 at the one end 1A side when viewed from the lamination direction. When viewed from the lamination direction, at the other end 1B side of the element body 1, a portion of the fourth principal-surface electrode portion 22 and the forefront portion of the first principal-surface electrode portion 11 at the other end 1B side overlap each other. At the relevant position, the outer edges 22a, 22c, and 22d of the fourth principal-surface electrode portion 22 are arranged so as to surround the forefront portion of the first principal-surface electrode portion 11 at the other end 1B side when viewed from the lamination direction. In the overlapping portion, the capacitive component of a capacitor is formed.

Figure 4:
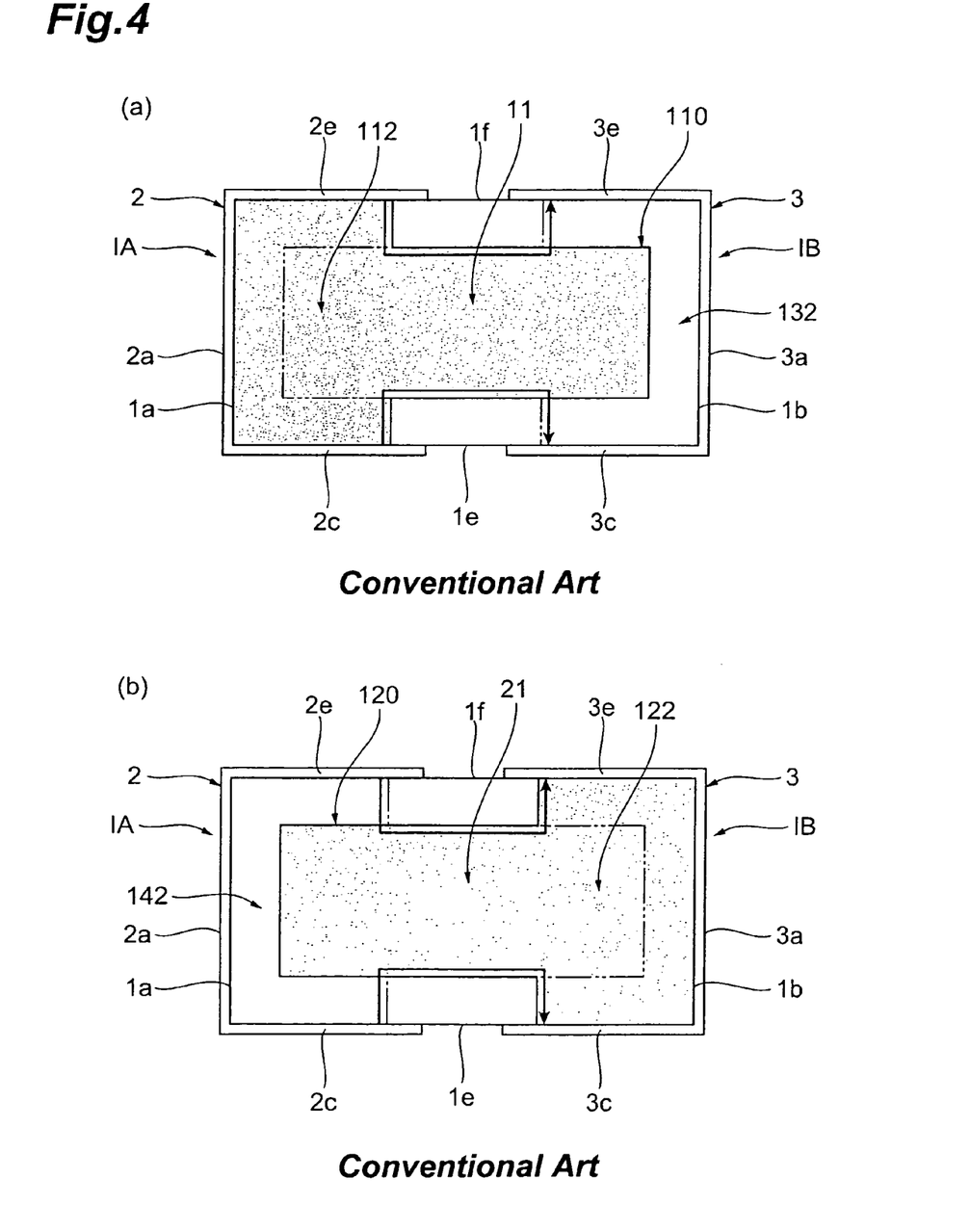
FIGS. 4A and 4B are diagrams of a first internal electrode and a second internal electrode of a known multilayer capacitor when viewed from a lamination direction.

Next, the advantages of the multilayer capacitor C1 according to this embodiment will be described with reference to FIGS. 3A to 4B. FIGS. 4A and 4B are diagrams of internal electrodes in a known multilayer capacitor when viewed from the lamination direction. As shown in FIGS. 4A and 4B, in the known multilayer capacitor, a second principal-surface electrode portion 112 is formed over the entire surface at one end 1A side, and is connected to a first end portion 2a and first lateral portions 2c and 2e of a first terminal electrode 2. The fourth principal-surface electrode portion 122 is formed over the entire surface at the other end 1B side, and is connected to the second end portion 3a and the second lateral portions 3c and 3e of the second terminal electrode 3. At the time of lamination of the element body 1, when the dielectric layer and the internal electrode are in contact with each other and calcinated, the relevant portion may exhibit insufficient fixing strength. In a portion where no internal electrode is formed and the dielectric layer is exposed, the dielectric of the dielectric layer is in contact with the dielectric on the rear surface of the overlying dielectric layer. The portions where the dielectric layers are in contact with each other are rigidly adhered to each other at the time of calcination. In the known multilayer capacitor, an exposed portion 132 is formed in the first internal electrode 110 at the other end 1B side, such that rigid adhesion can be made; however, since the second principal-surface electrode portion 112 covers the entire surface of the dielectric layer 6 at the one end 1A side, fixing strength at the one end 1A side becomes insufficient. An exposed portion 142 is formed in the second internal electrode 120 at the one end 1A side, such that rigid adhesion can be made; however, since the fourth principal-surface electrode portion 122 covers the entire surface of the dielectric layer 6 at the other end 1B side, fixing strength at the other end 1B side becomes insufficient.

In the multilayer capacitor C1 according to this embodiment, the outer edges 12a, 12c, and 12d of the second principal-surface electrode portion 12 are respectively separated from the end surface 1a and the lateral surfaces 1e and 1f at the one end 1A side, such that an exposed portion 31 where the surface of the dielectric layer 6 is exposed is formed at the one end 1A side of the dielectric layer 6 with the first internal electrode 10 formed thereon. That is, in the dielectric layer 6 with the first internal electrode 10 formed thereon, not only an exposed portion 32 near the second terminal electrode 3 having a different polarity but also the exposed portion 31 near the first terminal electrode 2 having the same polarity is formed. The outer edges 22a, 22c, and 22d of the fourth principal-surface electrode portion 22 are respectively separated from the end surface 1b and the lateral surfaces 1e and 1f at the other end 1B side, such that an exposed portion 41 where the surface of the dielectric layer 6 is exposed is formed at the other end 1B side of the dielectric layer 6 with the second internal electrode 20 formed thereon. That is, in the dielectric layer 6 with the second internal electrode 20 formed thereon, not only an exposed portion 42 near the first terminal electrode 2 having a different polarity but also the exposed portion 41 near the second terminal electrode 3 having the same polarity is formed. In this way, the dielectric layer 6 with the first internal electrode 10 formed thereon and the dielectric layer 6 with the second internal electrode 20 formed thereon are rigidly fixed to the overlying dielectric layers 6 at both of the one end 1A side and the other end 1B side. The dielectric layers 6 are rigidly fixed to each other at both ends of the element body 1, and adhesiveness is improved. In particular, the terminal electrode having the same polarity as the lead portion is narrower than the terminal electrode having a different polarity of the lead portion by the exposed portion of the dielectric layer. Hence, there is demand for an increase in the area of the exposed portion. Meanwhile, the first lead portions 14 and 16 are respectively connected to the outer edges 12c and 12d of the second principal-surface electrode portion 12 in the width direction near the other end 1B side. Thus, the exposed portion 31 of the dielectric layer 6 with the first internal electrode 10 formed thereon at the one end 1A side can be increased. The second lead portions 24 and 26 are respectively connected to the outer edges 22e and 22d of the fourth principal-surface electrode portion 22 in the width direction at the one end 1A side. Thus, the exposed portion 41 of the dielectric layer 6 with the second internal electrode 20 formed thereon at the other end 1B side can be increased. Therefore, the dielectric layers 6 are more rigidly fixed to each other at both ends of the element body 1, and adhesiveness is improved.

The first lead portion 14 connects the second principal-surface electrode portion 12 and the first lateral portion 2c of the first terminal electrode 2, and the second lead portion 24 connects the fourth principal-surface electrode portion 22 and the second lateral portion 3c of the second terminal electrode 3. The first lead portion 16 connects the second principal-surface electrode portion 12 and the first lateral portion 2e of the first terminal electrode 2, and the second lead portion 26 connects the fourth principal-surface electrode portion 22 and the second lateral portion 3e of the second terminal electrode 3. In this way, the first lead portion 14 and the second lead portion 24 having different polarities are led to the same lateral surface 1e of the element body 1, and the terminal electrodes 2 and 3 respectively have the lateral portions 2e and 3c formed on the lateral surface 1e. The first lead portion 16 and the second lead portion 26 having different polarities are led to the same lateral surface 1f of the element body 1, and the terminal electrodes 2 and 3 respectively have the lateral portions 2e and 3e formed on the lateral surface 1f. Therefore, the inter-lead-electrode distances between the first lead portions 14 and 16 and the second lead portions 24 and 26 having different polarities are shortened compared to a case where the internal electrode is simply led from the end surface 1a or the end surface 1b of the element body 1. That is, current paths EL1 and EL2 are shortened, reducing the ESL. For example, when the internal electrode is moved to the lateral portion of the terminal electrode on the mounting surface in the width direction so as to reduce the ESL, the ESL increases adversely compared to a case where the opposite lateral portion is mounted. However, in the multilayer capacitor C1 according to this embodiment, each lead portion is led to the lateral surface of the element body 1, reducing variations in the ESL depending on the mounting direction. In particular, the first lead portions 14 and 16 are respectively connected to the outer edges 12c and 12d of the second principal-surface electrode portion 12 in the width direction near the other end 1B side, and the second lead portions 24 and 26 are respectively connected to the outer edges 22c and 22d of the fourth principal-surface electrode portion 22 in the width direction near the one end 1A side. Therefore, the current paths EL1 and EL2 can be further shortened, and the ESL can be further reduced.

In the width direction of the first internal electrode 10 and the second internal electrode 20, the outer edges 12c and 12d of the second principal-surface electrode portion 12 are arranged outside the outer edges 11b and 11c of the first principal-surface electrode portion 11, and the outer edges 12a, 12c, and 12d of the second principal-surface electrode portion 12 are arranged so as to surround the forefront portion of the third principal-surface electrode portion 21 at the one end 1A side when viewed from the lamination direction. In the width direction, the outer edges 22c and 22d of the fourth principal-surface electrode portion 22 are respectively arranged outside the outer edges 21b and 21c of the third principal-surface electrode portion 21, and the outer edges 22a, 22c, and 22d of the fourth principal-surface electrode portion 22 are arranged so as to surround the forefront portion of the first principal-surface electrode portion 11 at the other end 1B side when viewed from the lamination direction. For example, when viewed from the lamination direction, the second principal-surface electrode portion of the first internal electrode and the third principal-surface electrode portion of the second internal electrode may have the same size. In this case, when lamination misalignment occurs at the time of lamination of the dielectric layers 6, a region occurs between the second principal-surface electrode portion and the third principal-surface electrode portion where the second principal-surface electrode portion and the third principal-surface electrode portion do not overlap each other, and a capacitive component is not formed. Accordingly, variations in electrostatic capacitance of the multilayer capacitor may occur. However, in the multilayer capacitor C1 according to this embodiment, even when lamination misalignment occurs, the second principal-surface electrode portion 12 can be maintained in a state of overlapping the third principal-surface electrode portion 21, and the fourth principal-surface electrode portion 22 can be maintained in a state of overlapping the first principal-surface electrode portion 11. Therefore, variations in electrostatic capacitance due to lamination misalignment can be suppressed. As a result, reliability of the multilayer capacitor C1 can be improved.

[Second Embodiment]

Figure 5:
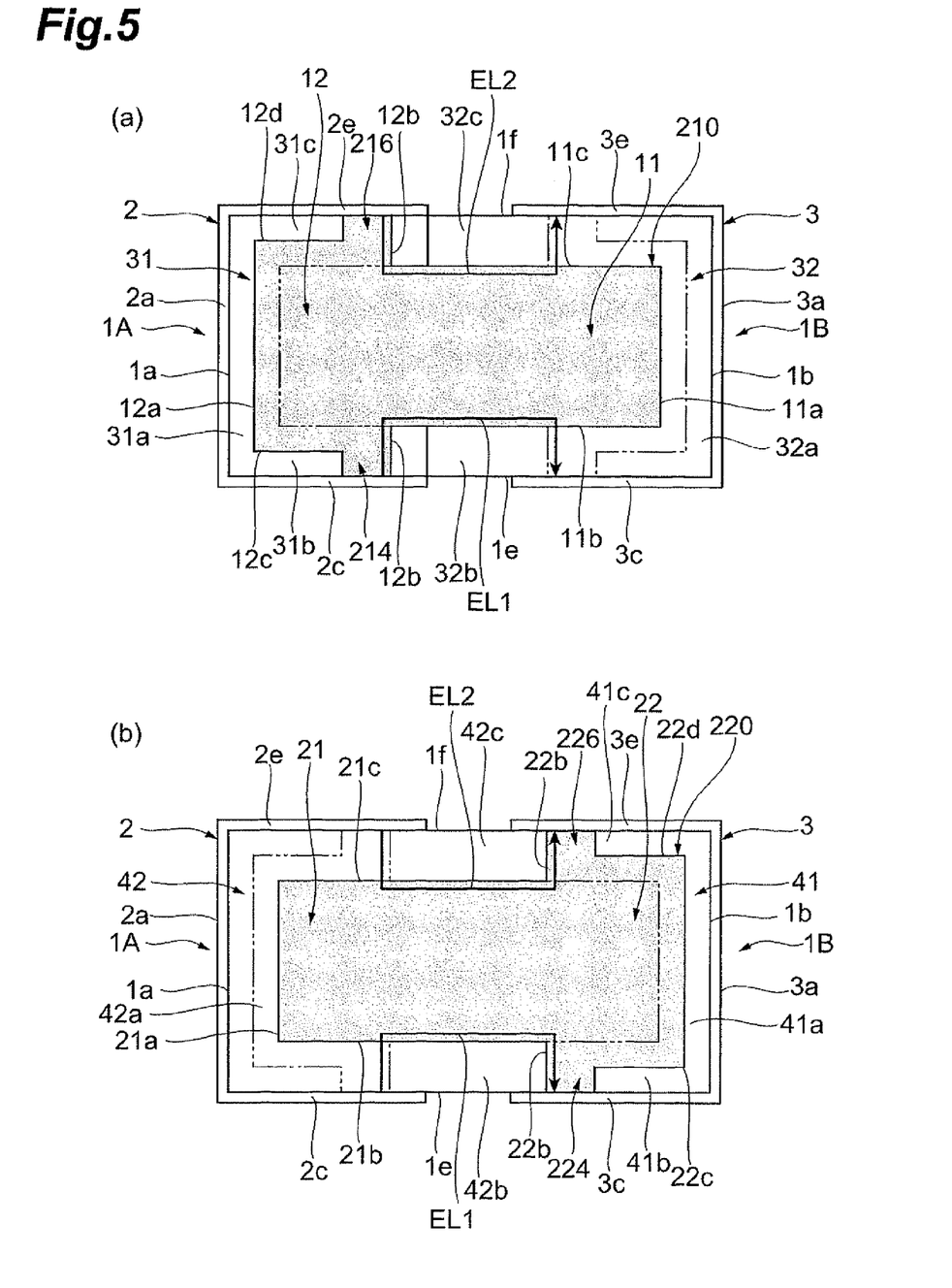
FIGS. 5A and 5B are diagrams of a first internal electrode and a second internal electrode of a multilayer capacitor according to a second embodiment when viewed from a lamination direction.

A multilayer capacitor according to a second embodiment will be described with reference to FIGS. 5A and 5B. FIGS. 5A and 5B are diagrams of a first internal electrode and a second internal electrode of the multilayer capacitor according to the second embodiment when viewed from the lamination direction. The multilayer capacitor according to the second embodiment is mainly different from the multilayer capacitor according to the first embodiment in that the positions of first lead portions 214 and 216 of a first internal electrode 210 and the positions of second lead portions 224 and 226 of a second internal electrode 220 are different from those in the multilayer capacitor according to the first embodiment.

Specifically, the first lead portion 214 is connected to the end portion at the other end 1B side of the outer edge 12c of the second principal-surface electrode portion 12 in the width direction. That is, the outer edge of the first lead portion 214 at the other end 1B side is aligned with the outer edge 12b of the second principal-surface electrode portion 12 at the other end 1B side. The first lead portion 216 is connected to the end portion at the other end 1B side of the outer edge 12d of the second principal-surface electrode portion 12 in the width direction. That is, the outer edge of the first lead portion 216 at the other end 1B side is aligned with the outer edge 12b of the second principal-surface electrode portion 12 at the other end 1B side. The second lead portion 224 is connected to the end portion at the one end 1A side of the outer edge 22c of the fourth principal-surface electrode portion 22 in the width direction. That is, the outer edge of the second lead portion 224 at the one end 1A side is aligned with the outer edge 22b of the fourth principal-surface electrode portion 22 at the one end 1A side. The second lead portion 226 is connected to the end portion at the one end 1A side of the outer edge 22d of the fourth principal-surface electrode portion 22 in the width direction. That is, the outer edge of the second lead portion 226 at the one end 1A side is aligned with the outer edge 22b of the fourth principal-surface electrode portion 22 at the one end 1A side.

According to the multilayer capacitor of the second embodiment, the area of the exposed portion 31 where the surface of the dielectric layer 6 is exposed can be increased near the one end 1A side from the first lead portions 214 and 216. The area of the exposed portion 41 where the surface of the dielectric layer 6 is exposed can be increased near the other end 1B side from the second lead portions 224 and 226. Thus, the dielectric layers 6 can be more rigidly fixed to each other, and adhesiveness of the element body 1 is improved. The distances between the first lead portions 214 and 216 and the second lead portions 224 and 226 are shortened, further shortening the current paths EL1 and EL2 and further reducing the ESL.

[Third Embodiment]

Figure 6:
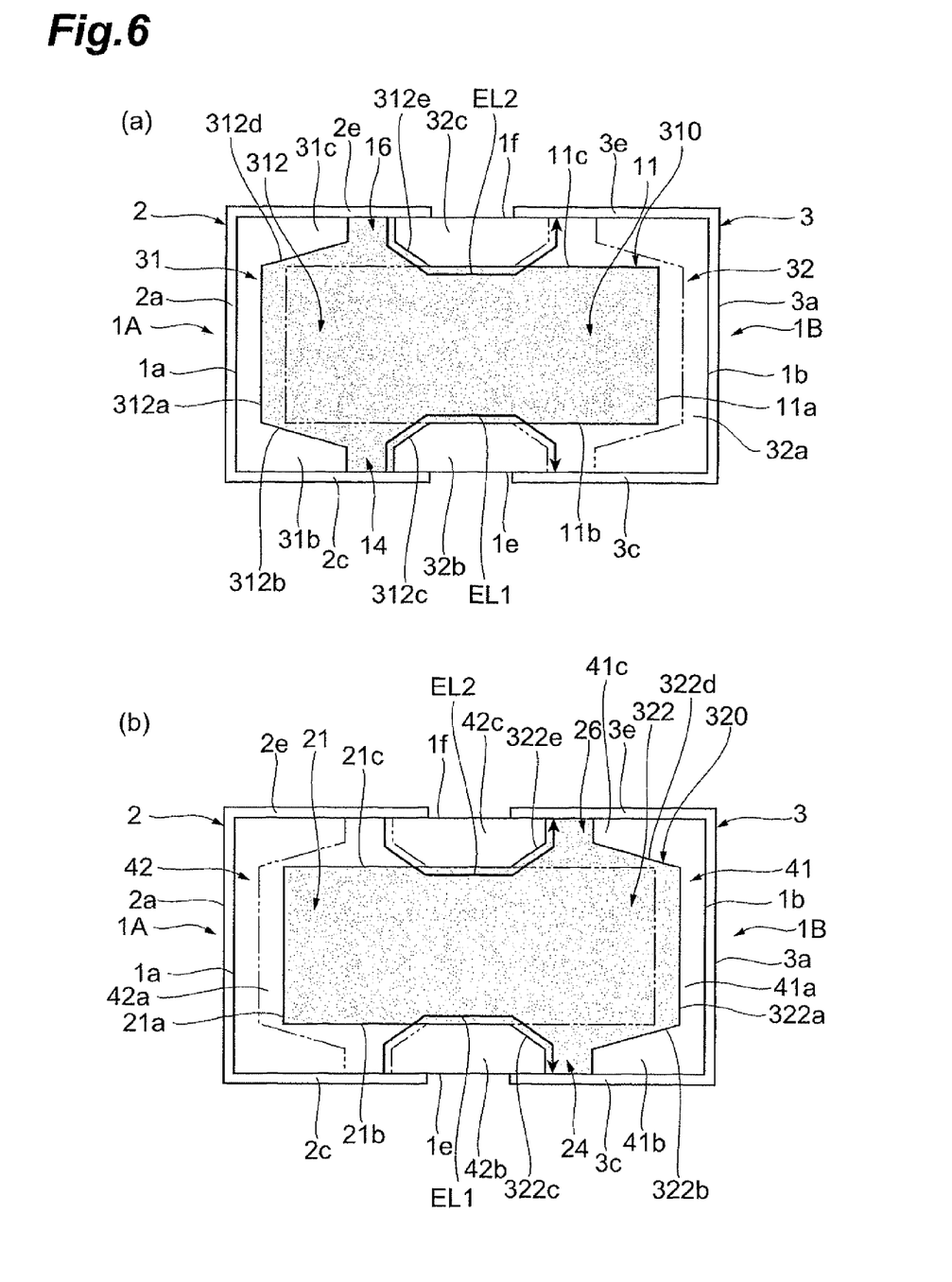
FIGS. 6A and 6B are diagrams of a first internal electrode and a second internal electrode of a multilayer capacitor according to a third embodiment when viewed from a lamination direction.

A multilayer capacitor according to a third embodiment will be described with reference to FIGS. 6A and 6B. FIGS. 6A and 6B are diagrams of a first internal electrode and a second internal electrode of the multilayer capacitor according to the third embodiment when viewed from the lamination direction. The multilayer capacitor according to the third embodiment is different from the multilayer capacitor according to the first embodiment in that inclined portions are formed at four corners of each of a second principal-surface electrode portion 312 and a fourth principal-surface electrode portion 322.

Specifically, at the outer edges of the second principal-surface electrode portion 312 in the width direction, inclined portions 312b and 312d are formed near the one end 1A side from the first lead portions 14 and 16 of a first internal electrode 310 so as to be inwardly inclined to the one end 1A side, and inclined portions 312c and 312e are formed near the other end 1B side from the first lead portions 14 and 16 so as to be inwardly inclined toward the other end 1B side. At the outer edges of the fourth principal-surface electrode portion 322 in the width direction, inclined portions 322b and 322d are formed near the other end 1B side from the second lead portions 24 and 26 of a second internal electrode 320 so as to be inwardly inclined toward the other end 1B side, and inclined portions 322c and 322e are formed near the one end 1A side from the second lead portions 24 and 26 so as to be inwardly inclined toward the one end 1A side. Even when the inclined portions are formed, when viewed from the lamination direction, the outer edges of the second principal-surface electrode portion 312 surround the forefront portion of the third principal-surface electrode portion 21 at the one end 1A side, and the outer edges of the fourth principal-surface electrode portion 322 surround the forefront portion of the first principal-surface electrode portion 11 at the other end 1B side.

According to the multilayer capacitor of the third embodiment, the inclined portions 312b, 312c, 312d, and 312e are formed at the four corners of the second principal-surface electrode portion 312, and the inclined portions 322b, 322c, 322d, and 322e are formed at the four corners of the fourth principal-surface electrode portion 322, increasing the areas of the exposed portions where the surface of the dielectric layer 6 is exposed. Therefore, the dielectric layers 6 are more rigidly fixed to each other, and adhesiveness of the element body 1 is improved.

[Fourth Embodiment]

Figure 7:
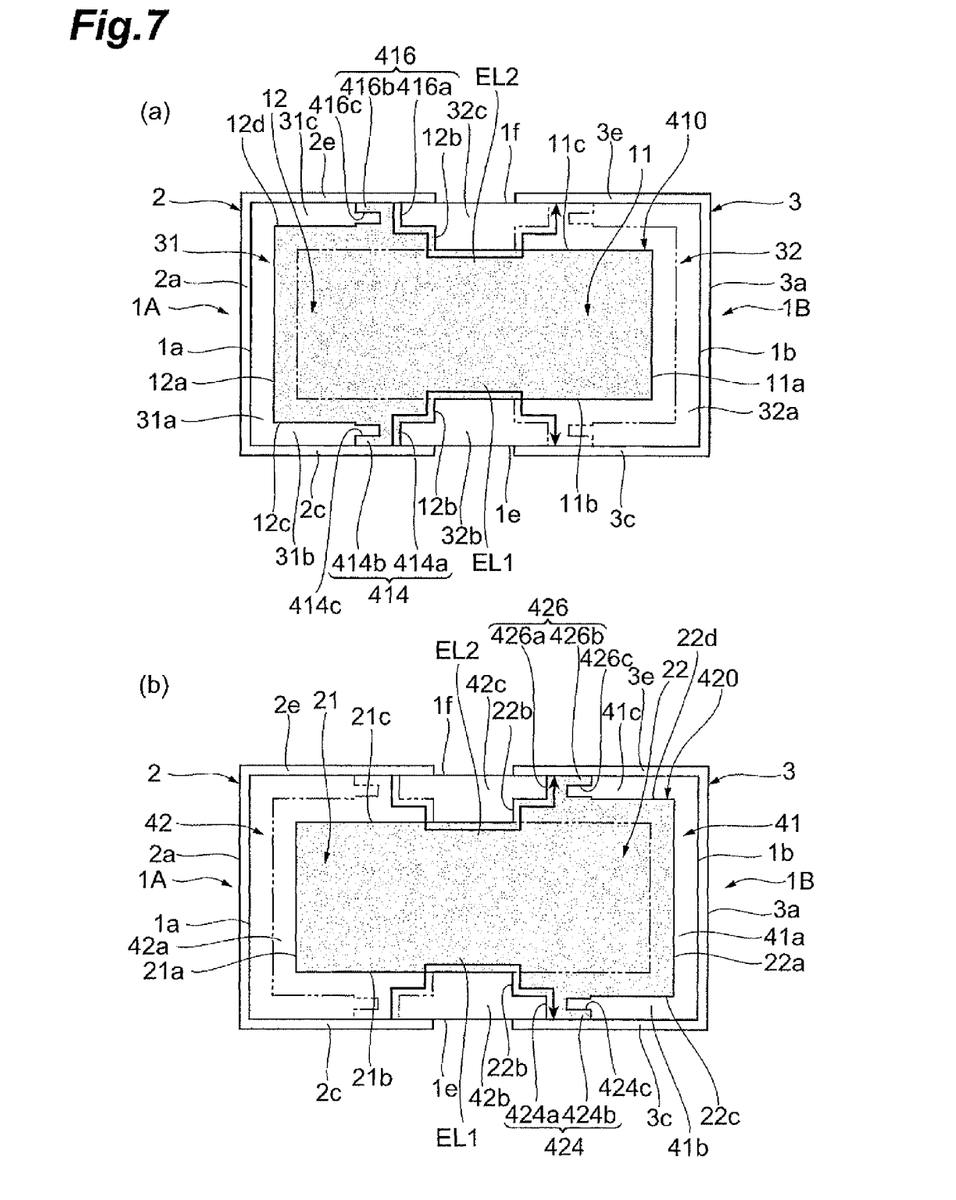
FIGS. 7A and 7B are diagrams of a first internal electrode and a second internal electrode of a multilayer capacitor according to a fourth embodiment when viewed from a lamination direction.

A multilayer capacitor according to a fourth embodiment will be described with reference to FIGS. 7A and 7B. FIGS. 7A and 7B are diagrams of a first internal electrode and a second internal electrode of the multilayer capacitor according to the fourth embodiment when viewed from the lamination direction. The multilayer capacitor according to the fourth embodiment is different from the multilayer capacitor according to the first embodiment in terms of the shapes of first lead portions 414 and 416 of a first internal electrode 410 and second lead portions 424 and 426 of a second internal electrode 420.

Specifically, the first lead portions 414 and 416 of the first internal electrode 410 respectively have first small-width portions 414a and 416a extending from the second principal-surface electrode portion 12 in the width direction, and first connection portions 414b and 416b extending to the one end 1A side at portions where connection is made to the first lateral portions 2c and 2e of the first terminal electrode 2. The second lead portions 424 and 426 of the second internal electrode 420 respectively have second small-width portions 424a and 426a extending from the fourth principal-surface electrode portion 22 in the width direction, and second connection portions 424b and 426b extending to the other end 1B side at portions where connection is made to the second lateral portions 3c and 3e of the second terminal electrode 3. The first lead portions 414 and 416 respectively have a shape with slits 414c and 416c extending from the one end 1A side to the other end 1B side compared to the first lead portions 14 and 16 according to the first embodiment. The second lead portions 424 and 426 respectively have a shape with slits 424c and 426c extending from the other end 1B side to the one end 1A side compared to the second lead portions 24 and 26 according to the first embodiment. In the longitudinal direction of the slits 414c, 416c, 424c, and 426c, the occupying ratio of each of the slits with respect to a corresponding one of the lead portions 14, 16, 24, and 26 is in a range of 50% to 70%. In the width direction, the occupying ratio of each of the slits with respect to a corresponding one of the lead portions 14, 16, 24, and 26 is in a range of 30% to 50%. With this configuration, the current paths EL1 and EL2 can be shortened because of the small-width portions 414a, 416a, 424a, and 426a arranged inside the element body 1, and the ESL can be made low. In addition, since the connection portions 414b, 416b, 424b, and 426b are formed, connectivity to the terminal electrodes 2 and 3 can be ensured. The surfaces of the dielectric layers 6 are exposed from the slits 414c, 416c, 424c, and 426c between the small-width portions 414a, 416a, 424a, and 426a and the connection portions 414b, 416b, 424b, and 426b, increasing the exposed area of each of the exposed portions 31, 32, 41, and 42. Therefore, adhesiveness of the element body 1 can be improved.

[Fifth Embodiment]

Figure 8:
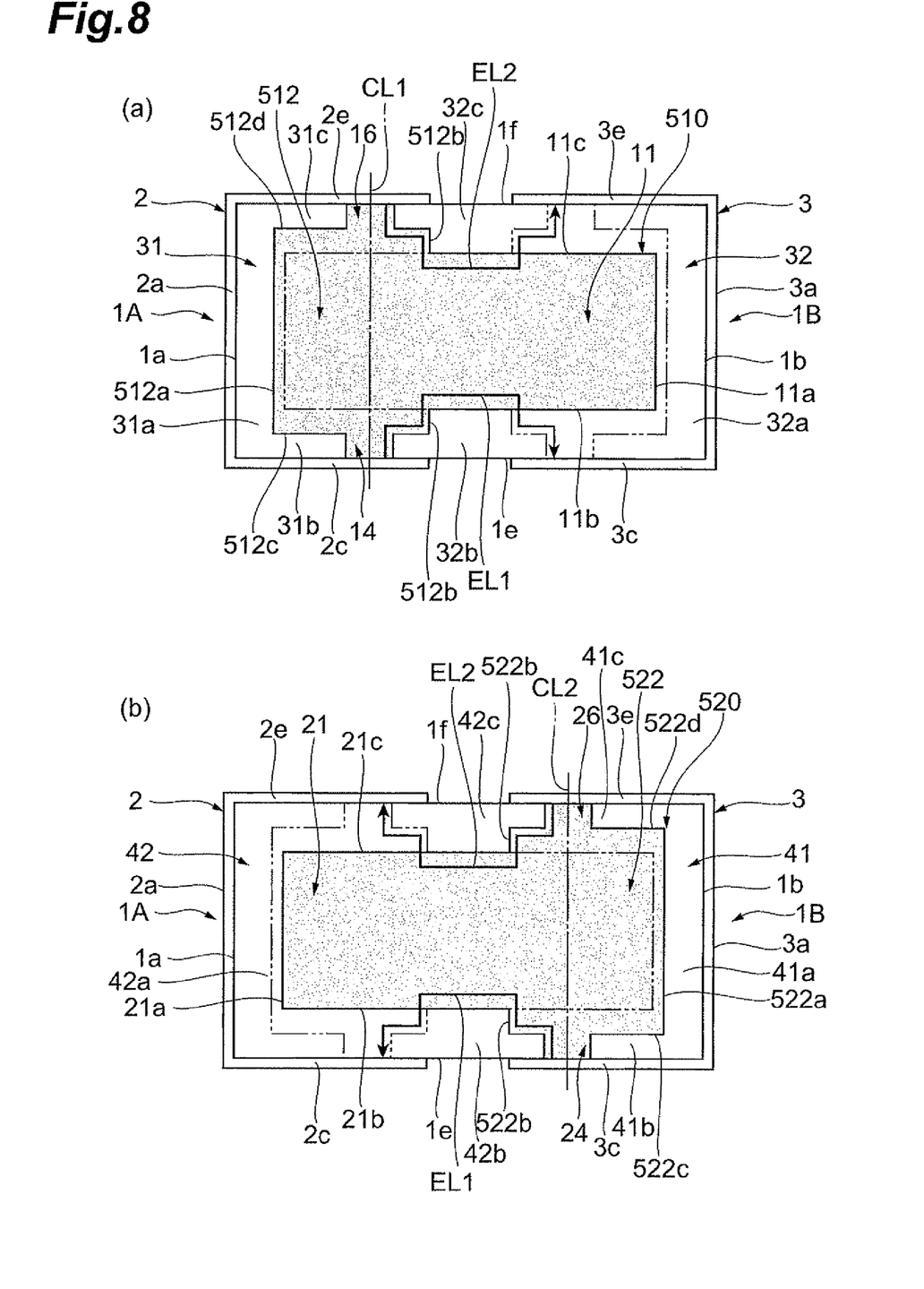
FIGS. 8A and 8B are diagrams of a first internal electrode and a second internal electrode of a multilayer capacitor according to a fifth embodiment when viewed from a lamination direction.

A multilayer capacitor according to a fifth embodiment will be described with reference to FIGS. 8A and 8B. FIGS. 8A and 8B are diagrams of a first internal electrode and a second internal electrode of the multilayer capacitor according to the fifth embodiment when viewed from the lamination direction. The multilayer capacitor according to the fifth embodiment is different from the multilayer capacitor according to the first embodiment in that the length of a second principal-surface electrode portion 512 of a first internal electrode 510 in the longitudinal direction and the length of a fourth principal-surface electrode portion 522 of a second internal electrode 520 in the longitudinal direction are different from those in the multilayer capacitor according to the first embodiment of the invention.

Specifically, the space between an outer edge 512a of the second principal-surface electrode portion 512 and an outer edge 21a of the third principal-surface electrode portion 21 in the longitudinal direction of the first internal electrode 510 and the second internal electrode 520 is smaller than the spaces between outer edges 512c and 512d of the second principal-surface electrode portion 512 and the outer edges 21b and 21c of the third principal-surface electrode portion 21 in the width direction. The space between an outer edge 522a of the fourth principal-surface electrode portion 522 and the outer edge 11a of the first principal-surface electrode portion 11 in the longitudinal direction is smaller than the spaces between outer edge 522c and 522d the fourth principal-surface electrode portion 522 and the outer edges 11b and 11c of the first principal-surface electrode portion 11 in the width direction. With this configuration, the distance between the end surface 1a of the element body 1 and the outer edge 512a of the second principal-surface electrode portion 512 at the one end 1A side increases, increasing the area of the side portion 31a of the exposed portion 31 at the one end 1A side where the surface of the dielectric layer 6 is exposed. The distance between the end surface 1b of the element body 1 and the outer edge 522a of the fourth principal-surface electrode portion 522 at the other end 1B side increases, increasing the area of the side portion 41a of the exposed portion 41 at the other end 1B side where the surface of the dielectric layer 6 is exposed. Therefore, adhesiveness of the element body 1 can be improved.

The invention is not limited to the above-described embodiments. For example, although in the multilayer capacitor C1 shown in FIG. 1, the terminal electrodes 2 and 3 cover the four lateral surfaces, at least the lateral surfaces 1d and 1f may be covered while the lateral surfaces 1c and 1e may not be covered.

What is claimed is:

1. A multilayer capacitor comprising:
   an element body formed by laminating a plurality of dielectric layers, the element body having a pair of end surfaces and four lateral surfaces connecting the end surfaces to each other;
   a first terminal electrode covering one end side of the element body;
   a second terminal electrode covering the other end side of the element body;
   a first internal electrode formed inside the element body so as to extend between the one end side of the element body and the other end side of the element body, and electrically connected to the first terminal electrode; and
   a second internal electrode formed inside the element body so as to extend between the one end side of the element body and the other end side of the element body with a dielectric layer sandwiched between the second internal electrode and first internal electrode, and electrically connected to the second terminal electrode, wherein the first terminal electrode has a first end portion covering the end surface at the one end side of the element body and first lateral portions covering the one end side of the element body at the four lateral surfaces, the second terminal electrode has a second end portion covering the end surface at the other end side of the element body and second lateral portions covering the other end side of the element body at the four lateral surfaces, the first internal electrode has a first principal-surface electrode portion and a second principal-surface electrode portion in order from the other end side of the element body toward the one end side of the element body, the first principal-surface electrode portion connecting directly with the second principal-surface electrode portion, and a first lead portion respectively connecting the second principal-surface electrode portion and the first lateral portion of the first terminal electrode, the second internal electrode has a third principal-surface electrode portion and a fourth principal-surface electrode portion in order from the one end side of the element body to the other end side of the element body, the third principal-surface electrode portion connecting directly with the fourth principal-surface electrode portion, and a second lead portion respectively connecting the fourth principal-surface electrode portion and the second lateral portion of the second terminal electrode, outer edges of the second principal-surface electrode portion are respectively separated from the end surface and the lateral surfaces at the one end side of the element body and are respectively arranged outside lateral outer edges of the first principal-surface electrode portion in the width direction of the first internal electrode and the second internal electrode so as to surround the forefront portion of the third principal-surface electrode portion at the one end side of the element body when viewed from the lamination direction of the element body, the lateral outer edges of the first principal-surface electrode portion are respectively separated from the lateral surfaces of the element body, and extend straight along a longitudinal direction;

an outer edge of the first principal-surface electrode portion is separated from the end surface at the other end side of the element body and the outer edge is not directly connected to another internal electrode portion;

outer edges of the fourth principal-surface electrode portion are respectively separated from the end surface and the lateral surfaces at the other end side of the element body and are respectively arranged outside lateral outer edges of the third principal-surface electrode portion in the width direction so as to surround the forefront portion of the first principal-surface electrode portion at the other end side of the element body when viewed from the lamination direction, the lateral outer edges of the third principal-surface electrode portion are respectively separated from the lateral surfaces of the element body, and extend straight along the longitudinal direction:

an outer edge of the third principal-surface electrode portion is separated from the end surface at the one end side of the element body;

the first lead portion is connected to the outer edge of the second principal-surface electrode portion in the width direction near the other end side of the element body, the second lead portion is connected to the outer edge of the fourth principal-surface electrode portion in the width direction near the one end side of the element body, a length of the first lead portion in the longitudinal direction of the first internal electrode and the second internal electrode is smaller than a length of the second principal-surface electrode portion in the longitudinal direction, a length of the second lead portion in the longitudinal direction is smaller than a length of the fourth principal-surface electrode portion in the longitudinal direction, a first exposed portion where the surface of the dielectric layer is exposed is formed near the one end side from the first lead portion, the first exposed portion has a wholly exposed first side portion between the outer edge of the dielectric layer in the longitudinal direction and the outer edge of the second principal-surface electrode portion in the longitudinal direction, and a wholly exposed second side portion between the outer edge of the dielectric layer in the width direction and the outer edge of the second principal-surface electrode portion in the width direction, a second exposed portion where the surface of the dielectric layer is exposed is formed near the other end side from the second lead portion, and the second exposed portion has a wholly exposed third side portion between the outer edge of the dielectric layer in the longitudinal direction and the outer edge of the fourth principal-surface electrode portion in the longitudinal direction, and a wholly exposed fourth side portion between the outer edge of the dielectric layer in the width direction and the outer edge of the fourth principal-surface electrode portion in the width direction.

2. The multilayer capacitor according to claim 1, wherein the first lead portion is connected to the end portion at the outer edge of the second principal-surface electrode portion in the width direction near the other end side of the element body, and the second lead portion is connected to the end portion at the outer edge of the fourth principal-surface electrode portion in the width direction near the one end side of the element body.

3. The multilayer capacitor according to claim 1, wherein a space between the outer edge of the second principal-surface electrode portion and the outer edge of the third principal-surface electrode portion in the longitudinal direction of the first internal electrode and the second internal electrode is smaller than spaces between the outer edges of the second principal-surface electrode portion and the outer edges of the third principal-surface electrode portion in the width direction, and a space between the outer edge of the fourth principal-surface electrode portion and the outer edge of the first principal-surface electrode portion in the longitudinal direction is smaller than spaces between the outer edges of the fourth principal-surface electrode portion and the outer edges of the first principal-surface electrode portion in the width direction.

4. The multilayer capacitor according to claim 1, wherein the first lead portion respectively has a first small-width portion extending from the second principal-surface electrode portion in the width direction, and a first connection portion extending to the one end side of the element body at portion where connection is made to the first lateral portion of the first terminal electrode, and the second lead portion respectively has a second small-width portion extending from the fourth principal-surface electrode portion in the width direction, and a second connection portion extending to the other end side of the element body at portion where connection is made to the second lateral portion of the second terminal electrode.

5. The multilayer capacitor according to claim 1, wherein the second principal-surface electrode portion has inclined portions at four corners, and the fourth principal-surface electrode portion has inclined portions at four corners.

\* \* \* \* \*